United States Patent [19]

Berrios et al.

[11] Patent Number: 5,315,498
[45] Date of Patent: May 24, 1994

[54] APPARATUS PROVIDING LEADING LEG CURRENT SENSING FOR CONTROL OF FULL BRIDGE POWER SUPPLY

[75] Inventors: Miguel A. Berrios, Kingston; Kevin R. Covi, Glenford, both of N.Y.

[73] Assignee: International Business Machines Corporation, Armonk, N.Y.

[21] Appl. No.: 996,230

[22] Filed: Dec. 23, 1992

[51] Int. Cl.$^5$ .......................................... H02M 7/5387
[52] U.S. Cl. ...................................... 363/98; 363/17; 363/132
[58] Field of Search ............................ 363/17, 98, 132

[56] References Cited

U.S. PATENT DOCUMENTS

| | | | |
|---|---|---|---|
| 3,663,949 | 5/1972 | Froeschle | 323/287 |
| 3,737,755 | 6/1973 | Calkin et al. | 363/17 |
| 3,818,318 | 6/1974 | Schott et al. | 323/287 |
| 4,475,149 | 10/1984 | Gallios | 363/17 |
| 4,533,836 | 8/1985 | Carpenter et al. | 363/17 |
| 4,710,686 | 12/1987 | Guzik | 363/98 |
| 4,713,740 | 12/1987 | Drabing | 363/17 |
| 4,758,941 | 7/1988 | Felton et al. | 363/132 |
| 4,772,996 | 9/1988 | Hanei et al. | 363/132 |
| 4,777,578 | 10/1988 | Jahns | 363/98 |
| 4,937,725 | 6/1990 | Dhyanchand et al. | 363/132 |
| 5,055,762 | 10/1991 | Disser et al. | 318/811 |

OTHER PUBLICATIONS

Bob Mammano et al., "Phase-Shifted PWM Control-A New Integrated Controller Eases The Design Of Efficient High-Frequency Bridge Power Switching", Unitrode IC Corporation, Merrimack, N.H. May 15, 1991.

*Primary Examiner*—Jeffrey L. Sterrett
*Attorney, Agent, or Firm*—Michael J. Scheer; Paul W. O'Malley; Andrew J. Dillon

[57] ABSTRACT

Disclosed is an apparatus for blanking the trailing edge of a sensed current signal taken from the leading leg of a full bridge voltage regulator. Switching elements in the arms of the full bridge voltage regulator cycle on and off in staggered phases under control of a pulse width modulation controller to provide zero voltage drop switching of the elements. With trailing edge blanking of the sensed current signal, a control waveform is generated for delivery to the pulse width modulation controller which mimics a sensed current signal taken from the lagging leg of the bridge. Such a current waveform exhibits a clear peak enhancing circuit stability thereby permitting use of leading leg current sensing to improve power supply efficiency.

13 Claims, 2 Drawing Sheets

APPARATUS PROVIDING LEADING LEG CURRENT SENSING FOR CONTROL OF FULL BRIDGE POWER SUPPLY

BACKGROUND OF THE INVENTION

1. Technical Field

The invention relates to voltage regulated power supplies for semiconductor based electronics and more particularly to providing a full bridge power supply with high operating efficiency and stability.

2. Description of the Related Art

Contemporary semiconductor electronic components generally operate with direct current supplied at low and closely controlled voltages. Close regulation of unipolar voltage is required because nearly all semiconductor components operate best at a constant power supply voltage. In some applications, such fine regulation is also required to minimize power loss, for example, where large variations in output current drawn by a load occur.

Switch mode power supplies are widely included among the most efficient of regulated power supplies because they provide such fine voltage regulation with little wasted power over a wide range of unregulated unipolar input voltages and output currents. Switch mode power supplies are usually connected to an unregulated, relatively high voltage direct current input source, and have one or more switching elements, an output transformer, output rectifying and filtering components, and a feedback control circuit controlling the switching element(s). The unregulated voltage level of the direct current input source is periodically applied to the primary winding of the output transformer by the switching element(s). The output off the secondary winding of the output transformer is rectified and filtered to supply power to semiconductor based electronics.

Control of the quantity of power transferred through the output transformer is done by varying the on time of the switching elements used to apply the voltage generated by the direct current input source to the output transformer. The control signals used to control the duty cycle of the switching elements are generated by the feedback control circuit in response to a direct or indirect measure of the power drawn from the output transformer. In response to that measure, the feedback control circuit pulse width modulates the gating control signals applied to the switching elements. As power drawn by a load connected to the output transformer increases, the proportion of the time the duty cycle takes increases. A decreasing duty cycle occurs with falling power demand. If the duty cycle changes without a change in power demanded, output voltages will change with potentially adverse consequences for the load electronics.

A favored type of switched mode power supply and voltage regulator arranges the switching elements in a full bridge topology, with each switching element driven by an isolated gate signal. In a full bridge, four switching elements are connected between the terminal ends of the primary winding of the output transformer and either ground or to the unregulated voltage direct current source. During each cycle, a terminal end will alternatingly be connected to the voltage source and to ground. During a portion of the period one terminal end is connected to ground the other terminal end is connected to the voltage source, and vice versa. Thus primary winding current reverses direction each half cycle. Alternating pairs of diagonally opposed switching elements in the bridge carry the current for a selected duration of each half cycle. During this period power is transferred to the load side of circuit. It is important to note that diagonally opposed pairs of switching elements are not turned on and off together, but in a phase staggered fashion.

Metal oxide semiconductor field effect transistors (MOSFETs), designed for power applications, are commonly used as the switching elements. See for an example of such an application, U.S. Pat. No. 4,758,941. MOSFETs are favored as switching elements in power applications because they work well as saturated devices, exhibit high input impedances and have a good thermal stability compared to bipolar junction transistors. The first two factors contribute to switching efficiency, which directly contributes to power supply efficiency.

One disadvantage of MOSFETs is that they have high drain to source capacitances. As a result, MOSFETs exhibit capacitive switching losses, which accumulate with increased switching frequency. Unfortunately, increasing switching frequency is desirable because it improves power pulse density for fine regulation of output voltage. As a result, operating efficiency of the power supply is directly and adversely affected by increasing switching frequencies. Capacitive switching losses can be reduced by switching MOSFETs at a zero voltage drop across the MOSFETs. However, simple application of zero voltage switching (ZVS) is complicated by other considerations.

As observed above, detection of power drawn from an output transformer may be direct or indirect. In the full bridge topology, determining the current in the primary winding of the output transformer is desirable for current mode control of the feedback control circuitry. The current in the primary winding reflects current in the secondary winding and thus is related to power demanded by the load connected to the rectifying and filtering circuitry. However, because current freewheels through the primary winding of the output transformer during switching, placing a current sensing transformer in series with the primary winding, or use of the primary winding itself for current sensing, does not work. The problem is that the current sensing transformer never sees zero current, preventing flux in the transformer from being reset.

A full bridge power supply and voltage regulator has four arms, two of which carry the current through the primary at any given time. No current is carried by a given arm in the bridge at least half the time. Current sensing can be done in the arms which allows for reset of the sensing transformer during the zero current periods. In application, two current transformers are used for current sensing. The transformers are located in one of the two legs of the bridge. A bridge leg includes two arms connected between the unregulated voltage direct current source and ground and directly connected to one another. When the switching element in one arm of the leg comes on in a half cycle of the bridge, the switching element in the other arm of the leg is off. If each arm of a leg has a current sensing transformer, one of the current transformers is active with each half cycle. With current sensing done in the arms of one leg, flux in the current sensing transformer in the quiescent arm can be reset.

The physical topology of a full bridge voltage regulator exhibits perfect mirror symmetry. Thus it may be surprising to the reader that the currents conducted by the legs do not exhibit the same symmetry. The phase relationships of the control or gating signals supplied by the feedback control circuitry to the MOSFETs result in the legs conducting different amounts of current. Phase staggered switching results in one leg of the bridge being a leading leg and the remaining leg being a lagging leg. An arm in the leading leg conducts positive current (by "positive is meant current in a direction opposite to the conducting orientation of the body diode of the switching power MOSFET) over its entire on period, following a brief negative current pulse in the body diode of the MOSFET. Net current in an arm of the leading leg over a cycle is positive. An arm in the lagging leg conducts negative current through its body diode during most of the freewheeling interval (corresponding to "off-time" of a conventional pulse width modulated regulator) and positive current as a new power pulse begins (i.e. the "on-time" of a conventional pulse width modulated regulator). Net current in an arm of the lagging leg can be positive or negative.

To use current mode sensing, a decision must be made as to which leg to place the current sensing transformers. Preferably, the decision should be based on the current profiles of the arms in the leading and lagging legs, respectively. On this basis, placing the current transformers in series with the MOSFETs in the arms of the leading leg would be desirable. One reason for this is that leading leg current is on net positive. This would allow use of passive reset networks for the current sensing transformers. For a current sensing transformer placed in an arm of the lagging leg, net current through the current sensing transformer can be positive or negative, which in turn requires an active network to determine the resulting orientation of the residual flux and to reset the flux to zero. An active reset circuit is more complex, more costly and uses more power than a passive circuit.

Another reason to locate current sensing transformers in the leading leg is that the resonant transition that occurs when a MOSFET switches is much slower for a MOSFET in the leading leg than for one in the lagging leg. This is because the only energy available to charge the drain to base capacitance of the MOSFET in the leading leg comes from the leakage inductance of the power transformer. For MOSFETs in the lagging leg, energy is also available from the output filter connected to the output transformer, which causes faster resonant transitions. The adverse consequences of adding parasitic inductance to a leg by insertion of current transformers is reduced if slower current transitions are seen.

Finally, were current sensed in the arms of the leading leg, it would be more nearly continuous. It is often desirable to generate a signal proportional to the output current of the power supply for diagnostic uses. Were leading leg current sensing used, a proportional current signal could be recovered with a simple resistor/capacitor filter (RC filter) connected to the current sense resistor. Where current sensing is done in the lagging leg, an active circuit has been used for peak detection because the feedback control signal is pulse width modulated.

Despite the advantages of leading leg sensing, circuit designers have placed current sensing transformers in the lagging leg of full bridge regulators. This is done because the signal recovered from the leading leg is not well suited for current mode control.

Leading leg current sensing has resulted in circuit instability. This undesirable result overrides all other factors in design consideration. Power supply circuits are feedback controlled circuits which use the current sense signal from the current transformers as the basis for a feedback control wave. Current in an arm of the leading leg is continuous from the on period into the following freewheeling interval, exhibiting only a change in slope. A control signal generated directly from such a current reflects the slopes of the current. Contemporary pulse width modulation controllers act as a source of a ramp current into current loop on the output side of the current transformers. This is required to stabilize the circuit. However, the ramp current changes the slope of the sensed current signal and can make detection of the peak of the control signal difficult if not impossible. Detection of the peak is essential because knowledge of its timing tells the pulse width controller how much power is being transferred through the output transformer. The positive slope of the ramp signal can cancel the negative slope of the control signal corresponding to the freewheeling phase of operation in the leading leg, obfuscating the peak. Under this condition a power supply can easily become unstable. Power duty cycle time can wander resulting in voltage transients across the load and possible damage to the load circuitry. By using lagging leg current sensing, a clean peak is obtained and stability problems are avoided.

SUMMARY OF THE INVENTION

It is therefore one object of the invention to provide an improved voltage regulated power supply for semiconductor based electronics.

It is another object of the invention to provide a full bridge power supply with high operating efficiency and stability.

It is yet another object of the invention to allow leading leg current sensing without loss of power supply stability.

The foregoing objects are achieved as is now described. The invention provides for blanking of the trailing edge of a sensed current signal taken from the leading leg of a full bridge voltage regulator. Switching elements in the arms of the full bridge voltage regulator cycle on and off in staggered phases under control of a pulse width modulation controller to provide zero voltage drop switching of the elements. With trailing edge blanking of the sensed current signal, a control waveform is generated for delivery to the pulse width modulation controller which mimics a sensed current signal taken from the lagging leg of the bridge. Such a current waveform exhibits a clear peak enhancing circuit stability thereby permitting use of leading leg current sensing to improve power supply efficiency.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
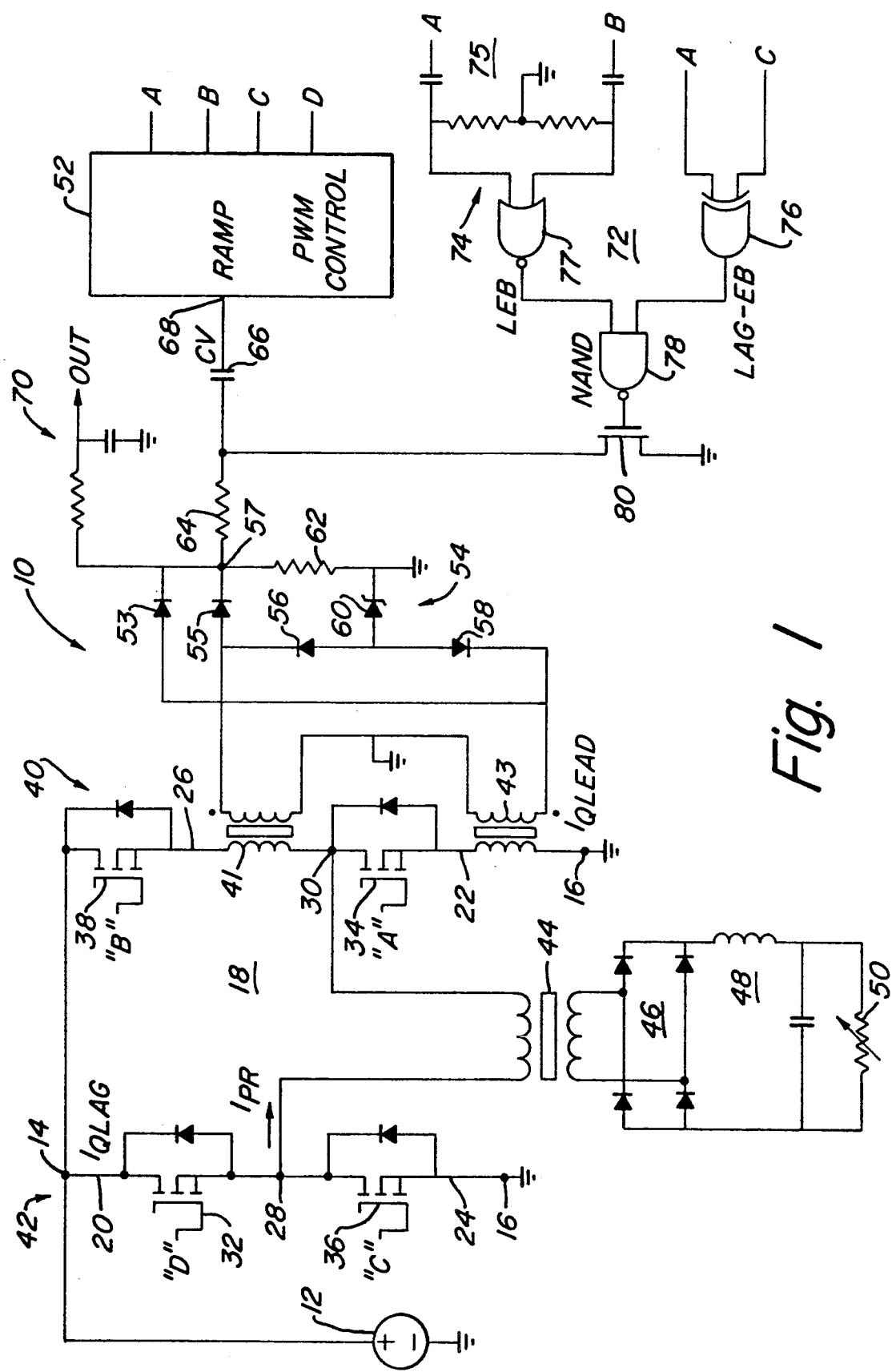
FIG. 1 is a mixed circuit schematic and block diagram of a pulse width modulated voltage regulated direct current power supply incorporating the present invention.

With reference now to the figures and in particular with reference to FIG. 1, there is depicted a circuit schematic of a voltage regulated power supply 10 connected to an unregulated voltage direct current source 12 at input nodes 14 and 16. Voltage regulated power supply 10 includes a full bridge switching regulator 18 having first, second, third and fourth arms 20, 22, 24 and 26, respectively. First arm 20 and third arm 24 are connected at output node 28. Similarly, second arm 22 and fourth arm 26 are connected at output node 30. Each arm includes a MOSFET switching element. MOSFET 32 is in arm 20, which is connected between input node 14 and output node 28. MOSFET 34 is in arm 22, which is connected between output node 30 and input node (ground) 16. MOSFET 36 is in arm 24, which is connected between output node 28 and input node (ground) 16. MOSFET 38 is in arm 26, which is connected between input node 14 and output node 30.

Arms 26 and 22 constitute, by virtue of the relative phase of the gating signals to MOSFETs 38 and 34, respectively, a leading leg 40 of full bridge switching regulator 18. Arms 20 and 24 constitute a lagging leg 42 in full bridge switching regulator 18. Leading leg 40 includes first and second current sensing transformers 41 and 43, respectively. Current sensing transformer 41 is connected in series with MOSFET 38 between node 14 and node 30. Current transformer 43 is connected in sensing with MOSFET 34 between node 30 and node 16. Integral with each MOSFET switching element is an antiparallel body diode. In MOSFETs 32 and 38 the body diodes are oriented to conduct current from an output node 28 and 30, respectively, to input node 14. In MOSFETs 36 and 34 the antiparallel body diodes are oriented to conduct electricity from ground into output nodes 28 and 30, respectively.

Full bridge switching regulator 18 provides pulse width modulated power pulses to an output transformer 44. The primary winding of output transformer 44 is connected between output node 28 and output node 30 of full bridge switching regulator 18. The output terminals of a secondary winding in output power transformer 44 are connected to the input terminals of a four diode rectifier 46. Output rectifier 46 is filtered by an LC (inductor/capacitor) filter 48 to provide voltage regulated direct current to a variable load 50 represented by adjustable resistor. Variable load 50 is typically semiconductor based microelectronics which draw varying amounts of current at a substantially constant voltage from LC filter 48. The current drawn by variable load 50 is sensed indirectly within full bridge switching regulator 18 to adjust the pulse width duration. This assures that sufficient power is transferred over output transformer 44 to maintain a constant output voltage across the variable load.

Pulse duration of current applied to the primary winding of output transformer 44 is controlled by the duration and phase relationships of control signals A, B, C and D, which are applied to the gates of MOSFETs 34, 38, 36 and 32, respectively. Because current drawn by variable load 50 is reflected in primary current $I_{pr}$ conducted by the primary winding of output transformer 44, indirect measurement of current drawn by variable load 50 can be done in full bridge switching regulator 18.

Roughly put, current flow through the primary winding of output transformer 44 is alternately established along two paths. One current path runs from ground through voltage supply 12 to node 14. From node 14 it runs through MOSFET 32 to node 28, then through the primary winding in node 30, through MOSFET 34 and current sensing transformer 44 to ground. During portions of alternate half cycles MOSFETs 32 and 34 are turned off and MOSFETs 38 and 36 are turned on to allow current to pass from node 14 through MOSFET 38 and a current sensing transformer 41 to node 30, from node 30 through the primary winding to node 28, and then through MOSFET 36 to ground. It has been noted above and is explained in more detail below that the diagonally opposed MOSFET pairs 32 and 34 and 36 and 38 are not fully synchronized, but operate in a staggered fashion depending on the relative phases of control signals A, B, C and D.

Pulse width modulated control signals A, B, C and D are generated by a feedback element comprising a pulse width modulated controller 52 such as a UC3875 PWM controller available from Unitrode IC Corporation of Merrimack, N.H. Control signals A and B are fixed by an internal oscillator in pulse width modulation controller 52. Control signals D and C, which are applied to the gates of MOSFETs 32 and 36 in lagging leg 42, vary as a function of a control waveform applied to ramp input 68. The control waveform CV is generated from a current sense signal derived from current sensing transformers 41 and 43. The positive going secondary current off the secondary windings of current sensing transformers 41 and 43 are passed by diodes 53 and 55 to node 57. A current sensing resistor 62 is connected between node 57 and ground to generate a voltage. The voltage appearing on node 57 is applied to an RC filter comprising resistor 64 and blocking capacitor 66. Current sensing resistor 62 converts the current signals from diodes 53 and 55 to a voltage signal on node 57 which is used for control purposes.

Flux in current sensing transformers 41 and 43 is reset once each cycle. Reset is accomplished during the interval when no current is flowing in the sensing transformer's primary windings. When there is no longer any current flow in the primary circuit to maintain the transformer magnetizing current, a resultant "inductive kick" causes the secondary voltage to reverse polarity thereby allowing the core flux to return to its initial value. The network composed of diodes 56 and 58 and zener diode 60 clamps the transformer secondary voltage occurring during the brief period of negative current flow that occurs prior to each power pulse through transformers 41 and 43. The zener voltage of zener diode 60 is selected to permit secondary volt-second balance to be obtained at the end of each cycle under the worst case condition of maximum load current and maximum duty cycle. Since the net secondary voltage during the on-time is positive because net current flow in each of the leading arms of leading leg 40 is positive, reset can always be accomplished passively by allowing the secondary voltage to swing negative as described above.

The current sense signal at node 57 is filtered by an RC circuit 70 to provide a proportional diagnostic output. Otherwise RC filter 70 is unnecessary to the operation of the invention. The current sense signal appearing at node 57 is applied by resistor 64 and capacitor 66 to ramp input 68. Ramp input 68 is also a source out of a constant current which flows back through capacitor 66, resistor 64 and current sense resistor 62 to ground. This constant current establishes a ramp of constant slope across capacitor 66, which is added to the current sense signal at node 57 and serves to stabilize the circuit. The magnitude of the current sourced at input 68 is so small as to develop a neglible voltage drop across resistors 62 and 64.

A transistor switch 80 is provided connecting the node between resistor 64 and capacitor 66 to ground. When switch 80 is turned on it blanks or zeroes the current sense signal. Switch 80 modifies the current sense signal to generate the control waveform CV. Transistor 80 is turned on to provide leading edge blanking and lagging edge blanking as explained below. Leading edge blanking is accomplished by using leading edges of control signals A and control signal B to trigger switch 80 on through a logic network 74. Control signals A and B are applied to a filtering network 75 designed to produce brief duration spikes corresponding to the leading edges of the control signals. The spikes are provided to the inputs of a negating OR logic element 77 to produce a leading edge blanking signal LEB. The signal LEB is applied to one of the input terminals of a NAND gate 78 which drives transistor switch 80 on. Lagging edge blanking (LAG-EB) is generated by applying control signals A and C to the inputs of an EXCLUSIVE OR gate 76. The output of EXCLUSIVE OR gate 76, which is LAG-EB, is applied to the other input terminal of NAND gate 78.

Leading edge blanking is used to suppress leading edge noise. The duration of the blanking pulse is adjusted by varying the RC time constant provided by network 75. Lagging edge information generated by EXCLUSIVE OR gate 76 identifies time periods corresponding to current freewheeling in regulator 18.

Ramp current out of port 68 provides slope compensation in the form of a constant current that is summed with the current sense signal. By coupling the constant current signal to sense node 57 through a capacitor, the constant current linearly charges the capacitor so that, in effect, a constant slope is added to the current sense signal in generating the control waveform. In order to DC couple a current signal to the control module, it is essential to reset the coupling capacitor 66 to zero with each cycle. Switching transistor 80 also performs this function. At the end of every clock cycle a transistor internal to the UC3875 pulse width modulation controller pulls the ramp port to ground. During this period transistor 80 is on which assures capacitor 66 is reset to zero. Thus no DC offset is carried on capacitor 66 from power cycle to power cycle which would impair current limiting performance of the power signal device.

Figure 2:
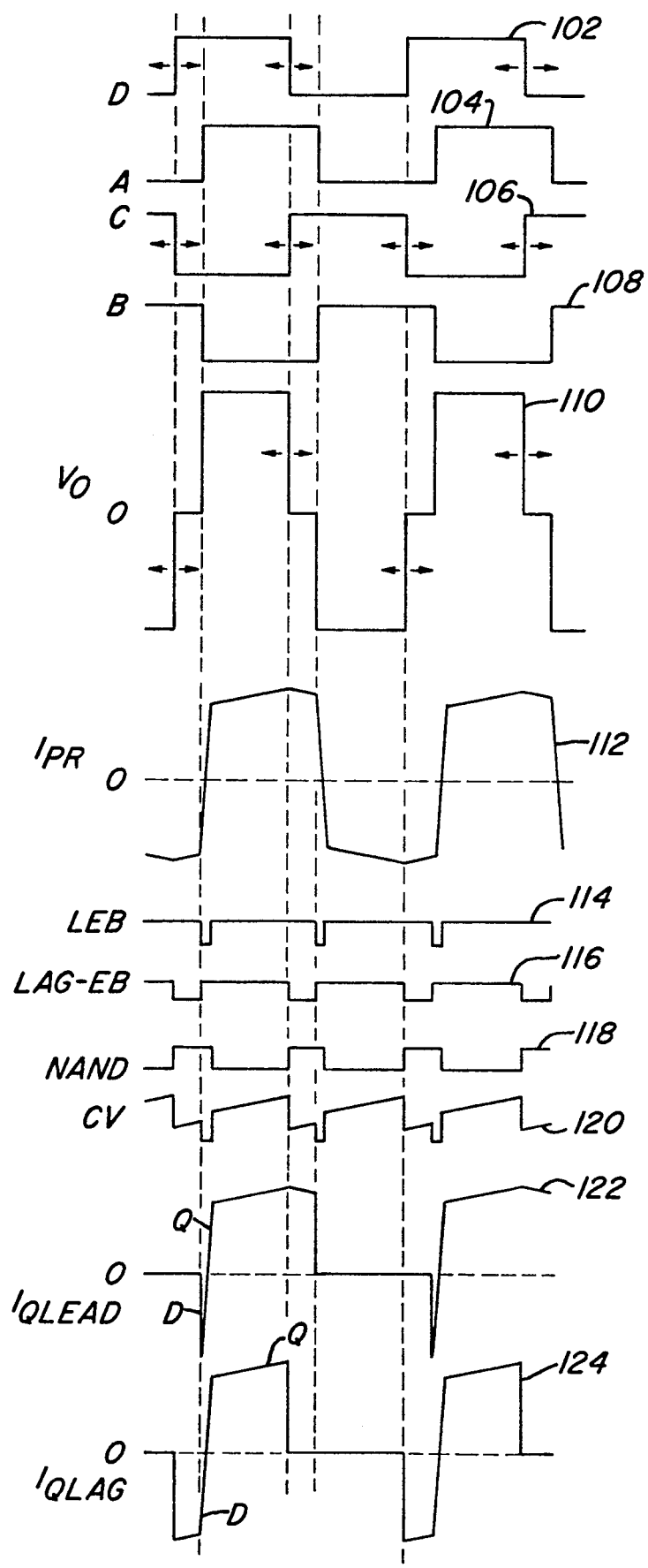
FIG. 2 is waveform timing diagrams for the circuit of FIG. 1.

Operation of voltage regulated power supply 10 is better understood with reference to plurality of voltage and current waveforms illustrated in FIG. 2. Voltage waveforms 102, 104, 106 and 108 represent the D, A, C and B outputs of pulse width modulation controller 52, respectively. Timing of the leading and trailing edges of signals 104 and 108 is fixed by an oscillator. The phase relationships of waveforms 102 and 106 to 104 and 108 are varied by controller 52 to provide pulse width modulation of the on times of MOSFETs 32 and 36 of the full bridge switching regulator 18. Voltage waveform 110 represents the voltage drop from node 28 to node 30 in full bridge switching regulator 18. The positive going and negative going pulses correspond to the on duty cycle times of switching regulator 18.

Current waveform 112 represents the current through the primary winding of output transformer 44 in the direction indicated by the arrow $I_{pr}$ in FIG. 1. Generally, current rises rapidly at the onset of a positive going pulse to near a peak value, where the current reflects current in the secondary winding of transformer 44. The slope then changes to a gradual rise to an actual peak which corresponds to the end of the on duty cycle of the switching elements. Power then gradually slopes downward representing freewheeling current through the primary sustained by stored energy in the transformer 44 and the output circuitry until voltage across nodes 28 and 30 is reversed. Current then rapidly goes negative. Both voltage 110 and current 112 reverse twice each cycle as diagonally opposite pairs of MOSFETs are turned on in staggered order and off in staggered order.

Signal LEB is represented by voltage waveform 114 which comprises a series of short duration pulses corresponding to leading edges of positive and negative going pulses occurring in waveform 110. Lagging edge blanking (LAG-EB) is represented by the voltage waveform 116 with negative going periods corresponding to periods of freewheeling current through the primary winding of transformer 44. These occur during periods when the voltage drop from node 28 to node 30 is zero. The NAND signal represented by curve 118 is simply the negated summation of the leading edge blank signal 114 and the lagging edge blank signal 116. Control waveform CV is represented by voltage signal 120. Control waveform 120 is a scaled and rectified representation of the current signal $I_{pr}$, illustrated by curve 112, which has been slope adjusted by a ramp current source from pulse width modulation controller 52. In addition, those portions of the control waveform CV 120 which correspond in time to a positive going NAND signal 118 are blanked. By blanked it is meant that the values are reduced well below the peak value obtained in signal 120. Peak signal value of waveform CV is used by pulse width modulation controller to vary the timing of the trailing edges of waveforms 102 and 106 and thereby control the amount of power transferred to variable load 50 through output transformer 44.

Current waveforms 122 and 124 are included to illustrate the differences in current transmitted by an arm in the leading leg 40 of full bridge switching regulator 18 and the lagging leg 42, respectively.

For half a duty cycle, current in an arm equals zero. For $I_{qlead}$, which corresponds to current through arm 22, current briefly spikes negative as control signal A goes high. This current is carried by the antiparallel body diode. The positive portion of the curve labelled Q corresponds to current carried by MOSFET 34. The Q component initially rises rapidly, then gradually until MOSFET 32 is cut off by control signal D going to zero. Current then gradually declines from the peak until control signal A goes low whereupon the current falls to zero until the next cycle begins.

Current waveform 124 represents the current in arm 20, which is diagonally opposite arm 22. The portion of the curve labelled Q corresponds to current passing through MOSFET 32, while the negative portion of the curve labelled D represents current in the antiparallel body diode of MOSFET 32. Initially current is zero. Current then goes negative as control signal C to MOS- FET 36 is turned off. The body diode of MOSFET 32 provides a current path running from node 14 through MOSFET 38 and current sensing transformer 41 to node 30, and from node 30 through primary winding of transformer 44 to node 28 and back through the body diode MOSFET 32 to node 14. This is "freewheeling" current. Subsequently, as control signal A represented by curve 104 goes high and control signal B goes low cutting off MOSFET 38, current moves to a path from node 16 through arm 22, the primary winding of MOSFET 44 and MOSFET 32 to node 14 and power supply 12. As a result, the current in arm 20 reverses. The current in arm 20 increases until control signal D goes into cut off at which point the current goes to zero for a half cycle. The net negative and positive current depends on the timing of control signals C and D with respect to signals A and B. Net current in an arm in the lagging leg may be negative or positive.

At high switching frequencies, switching losses are minimized by switching at zero voltage drop across the MOSFET switching elements. This is done by staggering turn on and turn off of diagonally opposed pairs of MOSFETs. The present invention may be advantageously applied to such a circuit to provide leading leg current sensing allowing radical simplification of current sensing transformer reset circuitry without loss of stability due to application of ambiguous control waveforms to a pulse with modulation controller 52.

While the invention has been particularly shown and described with reference to a preferred embodiment, it will be understood by those skilled in the art that various changes in form and detail may be made therein without departing from the spirit and scope of the invention.

What is claimed is:

1. A voltage and power regulator comprising:
    a full bridge switching network having a switching element in each of four arms, input terminals for connection to an unregulated power supply and output terminals;
    current mode controller means responsive to a feedback control wave for supplying phase staggered control signals to the switching elements wherein the arms in a leading leg of the full bridge switching network conduct substantially unidirectional current having a duty cycle component and a freewheeling component;
    a power output transformer having a primary winding connected to the output terminals of the full bridge network;
    current sensing means in each arm of the leading leg connected in series with the switching element in the arm for generating a sensed signal on a sensed signal output terminal;
    logic means connected to the current mode controller means for generating logic pulses having duration equal to the duration of the freewheeling components of the unidirectional current in the leading leg; and
    means for producing the feedback control wave by summing the sensed signals and, responsive to the logic pulses, blanking portions of the sensed signals corresponding to the freewheeling components of current conducted in the leading leg.

2. A voltage and power regulator as set forth in claim 1, wherein the switching elements are metal oxide semiconductor field effect transistors (MOSFETs) having antiparallel body diodes.

3. A voltage and power regulator as set forth in claim 2, and further comprising:
    filtering means connected to the current sensing means for generating a proportional output signal.

4. A voltage and power regulator as set forth in claim 2, wherein the phase staggered control signals turn on alternating pairs of diagonally opposed MOSFETs in the full bridge in a staggered fashion whereby switching of an individual MOSFET occurs with a substantially negligible voltage difference between source and drain of the individual MOSFET.

5. A voltage and power regulator as set forth in claim 4, wherein the current sensing means include current sensing transformers having primary windings connected in series with the MOSFETs in the arms of the leading leg and passive circuit means connected to the output windings for resetting transformer core flux in the current sensing transformers.

6. A full bridge switching regulator comprising:
    switching elements in the arms of the full bridge switching regulator;
    means for cycling the switching elements on and off in staggered phases to provide zero voltage drop switching of the switching elements;
    means responsive to a current in an arm of a leading leg in the full bridge switching regulator for generating a sensed current signal; and
    means for blanking a trailing edge of the sensed current signal to generate a control waveform which is substantially zeroed during periods of conduction of freewheeling current through the arms of the leading leg.

7. A voltage and power regulator comprising:
    a full bridge switching network having two parallel legs connected between input terminals, each of the parallel legs having an upper switching element and a lower switching element and an output terminal between the upper and lower switching elements;
    current mode controller means responsive to a feedback control wave for supplying phase staggered control signals to opposed upper and lower switching elements of the two parallel legs, the phase staggered control signals providing for establishing one of the parallel legs as a leading leg in which the upper and lower switching elements conduct substantially unidirectional current having a duty cycle component and a free wheeling component and for establishing the other parallel leg as a lagging leg in which the upper and lower switching elements conduct current bidirectionally;
    a power output transformer having a primary winding connected between the output terminals;
    a current sensing transformer connected in series with the upper switching element of the leading leg and a second current sensing transformer connected in series with the lower switching element of the leading leg, whereby sensed signals are generated on a sensed signal output terminal; and
    means for generating the feedback control wave by summing the sensed signals from the leading leg and for blanking portions of the sensed signals corresponding to the freewheeling components of current conducted in the leading leg to produce clean peaks in the feedback control wave.

8. A voltage and power regulator as set forth in claim 7, wherein the switching elements are metal oxide semiconductor field effect transistors (MOSFETs) having antiparallel body diodes.

9. A voltage and power regulator as set forth in claim 8, wherein the means for generating the feedback control wave further comprise:
   logic means connected to the current mode controller means for generating logic pulses having duration equal to the duration of the freewheeling components of the unidirectional current in the leading leg; and
   means responsive to the logic pulses for blanking the summed sensed signals.

10. A voltage and power regulator as set forth in claim 9, wherein the phase staggered control signals turn on alternating pairs of diagonally opposed MOSFETs in the full bridge in a staggered fashion whereby switching of an individual MOSFET occurs with a substantially negligible voltage difference between source and drain of the individual MOSFET.

11. A voltage and power regulator as set forth in claim 8, and further comprising:
   filtering means connected to the current sensing means for generating a proportional output signal.

12. A voltage and power regulator as set forth in claim 11, wherein the current sensing means include current sensing transformers having primary windings connected in series with the MOSFETs in the arms of the leading leg.

13. A voltage and power regulator as set forth in claim 12, and further comprising:
   a passive network connected to the output windings for resetting transformer core flux in the current sensing transformers.

* * * * *